Dec. 6, 1927.  
J. A. SHIVELY  
1,651,734  
MACHINE FOR PUTTING SECOND FLIPPER ON BEADS  
Filed May 28, 1925  2 Sheets-Sheet 1
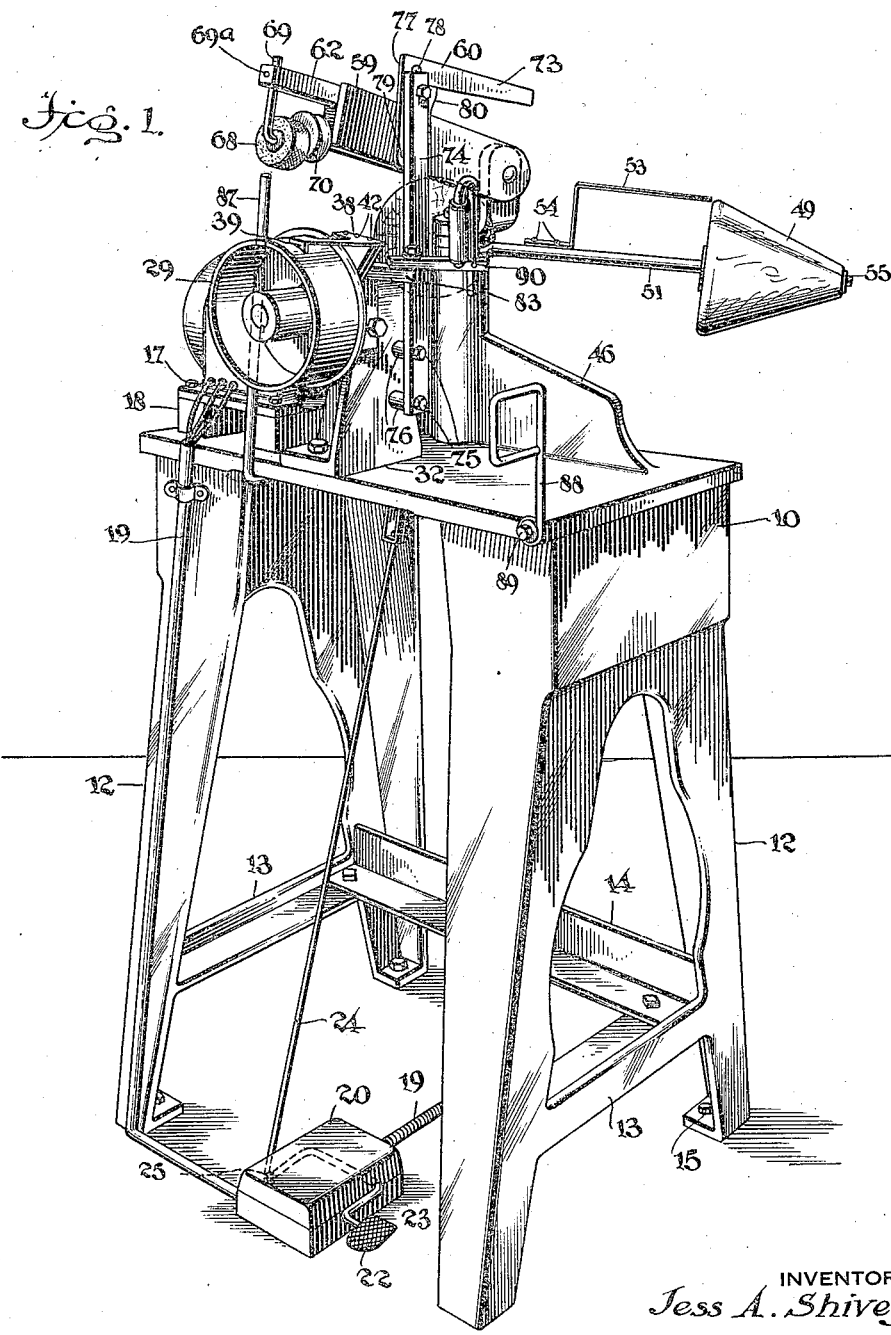
INVENTOR  
Jess A. Shively,  
BY  
ATTORNEY Dec. 6, 1927.  
J. A. SHIVELY  
1,651,734  
MACHINE FOR PUTTING SECOND FLIPPER ON BEADS  
Filed May 28, 1925   2 Sheets-Sheet 2
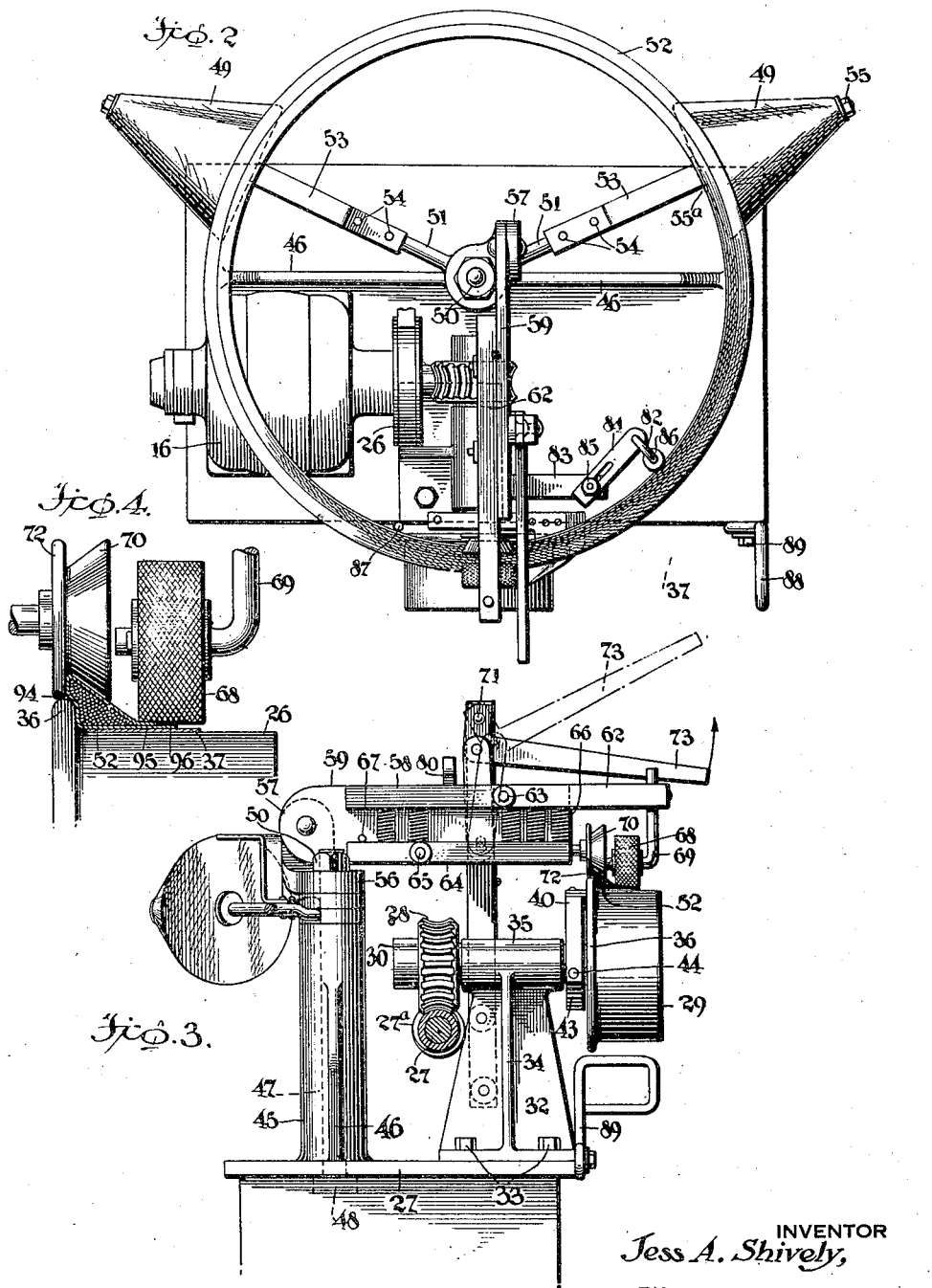
INVENTOR  
Jess A. Shively,  
BY  
ATTORNEY Patented Dec. 6, 1927.

1,651,734

UNITED STATES PATENT OFFICE.

JESS A. SHIVELY, OF AKRON, OHIO, ASSIGNOR TO THE GOODYEAR TIRE & RUBBER COMPANY, OF AKRON, OHIO, A CORPORATION OF OHIO.

MACHINE FOR PUTTING SECOND FLIPPER ON BEADS.

Application filed May 28, 1925. Serial No. 33,452.

This invention relates to a machine adapted to be employed in the manufacture of automobile tire beads and it has particular relation to a machine which is designed for the purpose of applying a reinforcing or flipper strip circumferentially about the tire bead.

One object of my invention is to provide a machine which will fulfill the function of securing a flexible strip of material to the surface of a tire bead in such manner as to reduce expenditure of time and labor.

Another object of my invention is to provide a machine constructed of a minimum number of parts which will support and guide a tire bead while it is being reinforced by mechanical application of a strip of flexible material thereto.

Tire beads are manufactured by building up a structure of rubber and rubberized fabric about an interior core composed of a number of wire strands or other strong and durable material. Rubberized fabric strips form outer layers of the bead which, in its completed state, is substantially of triangular shape in cross-section. One or more of the strips enclose the core of the bead and have edges extending tangentially beyond the apex of one of the angles of the bead. These edges serve the purpose of cooperating with the carcass of the tire to insure proper assembly of the bead and carcass. In some cases, especially with reference to so-called balloon tires, the sides of the carcass are subjected to a relatively wide range of flexure and the interior hard portion of the bead tends to wear through the fabric strip against the sides of the tire thereby causing damage thereto. To counteract the ill effects of this tendency, an additional strip of rubberized fabric, commonly known as a flipper-strip, is stitched to one of the sides of the bead with one edge extending beyond the projecting edge of the last strip which surrounds the bead.

Heretofore, the additional reinforcing strip or flipper strip has been applied manually, the workman placing the bead upon a form and guiding the strip circumferentially with the fingers. A hand tool was then employed to stitch the strip firmly against the bead. It is apparent that this procedure was tedious and slow, as well as presenting possibility for producing articles which were not uniform or which were defective, according to the skill and efficiency of the workman.

A machine embodying the principles of my invention obviates the disadvantages above mentioned. It is relatively simple in construction and the operation of it requires but little skill.

My invention as practiced, contemplates the construction of a machine adapted to be built upon a suitable support and driven from a source of power, such as an electric motor. A drum is geared to the motor and is driven thereby, the drum being in contact with a bead which is supported upon rotatable members in such manner that the bead is rotated in a horizontal plane when the motor is running. The drum is provided with guiding members for properly positioning a strip of material upon the bead and a plurality of roller members mounted adjacent the drum press the bead against the drum with sufficient force to cause it to adhere or be stitched to the bead.

The stitching roller members are mounted upon an arm provided with springs which cushion the action of the rollers against the bead. A lever mechanism is pivoted to a stationary portion of the support for the machine and is adapted to operate the arm carrying the rollers to move them toward and away from the drum. By placing one end of the flipper-strip upon the drum and positioning the tire bead over this end and then operating the lever to press the roller members into close contact with the bead, the bead is ready to be rotated. The motor is started and the flipper-strip is firmly stitched to one side of the bead as it travels in response to the rotation of the drum.

Reference may now be had to the accompanying drawings forming a part of this specification in which:

Fig. 1 is a perspective view illustrating the operating parts of my machine;

Fig. 2 is a plan view of the machine;

Fig. 3 is a fragmentary view partly in cross-section, illustrating details of my invention; and Fig. 4 is a view in detail of the drum and roller members incorporated in my invention.

Referring more particularly to the drawings, my invention consists of a metal frame in the form of a table or supporting member 10 provided with legs 12 and reinforcing cross members 13 and 14. The legs 12 are bolted to a foundation by means of bolts 15. The mechanism embodying the subject-matter of my invention is carried upon the top of the table 10. For the purpose of supplying power to my machine, I have provided an electric motor 16 which is bolted to the top of the table by means of nuts and bolts 17, which extend through spacing blocks 18. Conductors 19 are employed to connect the motor to a suitable source of power through a switch member 20, which is operated by a pedal 22. It will be noted that the pedal 22 is formed integrally with one end of a crank arm 23. The other end of the crank arm is bent at right angles and is pivotally connected to a rod 24, as indicated at 25. The purpose of this rod is to so actuate a brake 26 connected to the motor as to stop the motor when the pedal 22 is released.

A shaft 27 of the motor is provided with a drive pinion 27a intermeshing with a gear 28 which is adapted to rotate a drum 29, the latter being carried by a horizontal shaft 30 to which the last named gear wheel and drum are respectively keyed. As a support for the shaft 30, I have provided a suitable upright member 32 which is bolted to the top of the support 10, as indicated at 33 and is provided with a reinforcing web 34. The shaft 30 is adapted to rotate in a bearing 35 formed upon the upper portion of the support 32.

A tire bead when in position to have a strip stitched thereto, is in contact with the drum and is guided by a flange 36 formed at one edge of the drum. A strip of material which is to be stitched to the bead is indicated at 37 in Fig. 4. An end of this strip is placed upon the drum under a guide member 38 which extends horizontally over the drum and is formed with an end 39 turned at right angles thereto so that it is properly spaced from the periphery of the drum and prevents the strip from running off the edge of the drum. The guide 38 is fastened to a block 40 by means of screws or other suitable fastening means 42. The block 40 is secured at one end upon the bearing 35 and is formed with a split portion 43 which permits the block to be tightened or loosened with respect to the bearing when the bolt 44 is turned.

The central part of the support is formed with an upright member 45 which is provided with reinforcing flanges 46 and is formed with a vertical opening 47 adapted to receive a threaded rod 48, the rod being held in place by a nut 50. When a tire bead is placed upon the machine it is supported by cone shaped rollers 49 which are rotatably mounted upon arms 51, the latter being carried by the member 45 and secured rigidly in place on the rod 48 by the nut 50. The bead normally assumes the position indicated at 52 of Fig. 2, resting upon the cone shaped rollers 49. The bead is prevented from falling down against the arms 51, in case it is displaced, by means of angular bracket members 53 which are secured to the arms 51 by means of screws 54. The rollers 49 are secured upon the rods 51 by means of nuts 55 and cotter pins 55a.

The rod 48 carries at its upper end a member 56 which is clamped against the inner ends of the arms 51 and is provided with an integral ear 57. The means I have provided for stitching the strip 37 to the bead comprises a mechanism 58 including an arm 59 pivoted at one end to the ear 57 and connected at an intermediate point to a lever mechanism 60 presently to be described. The arm 59 is substantially rectangular in form and is provided at its upper edge with a bar 62 which is pivoted upon a bolt 63 secured to the arm. A second bar 64 is pivoted on a bolt 65 secured to the lower portion of the arm 59. These two bars are disposed parallel to each other and are provided with a plurality of springs 66 tending to maintain them in spaced relation. The lower bar 64 is limited in its pivotal movement by a pin 67 which is rigidly secured to the arm 59, and serves the function of maintaining the bars in parallelism with each other. A roller 68 is mounted upon a vertically adjustable rod 69 which is secured to the end of the bar 62. This roller is preferably constructed of material such as rubber and is provided with a covering of fabric material. In order to effect proper adjustment of the rod 69 a set screw 69a is provided in the end of the bar 62 for rigidly maintaining the rod in adjusted position. A second roller 70 is mounted at the end of the bar 64 and is formed with a flange 72, the latter being adapted to engage the flange on the drum 29 when the parts are in the position shown in Fig. 3.

The lever mechanism 60 is designed to actuate the arm 59 toward and away from the drum 29. This mechanism comprises a bell-crank lever 73 pivoted upon a bolt 71 at one end of an upright bar 74, the latter being rigidly secured to the support 32 by means of bolts and nuts 75. Sleeve members 76 are placed around the bolts 75 to properly space the bar from the support. A link 77 suspending the lever from the bar 74 is pivoted at one end to the angle of the bell-crank lever, as indicated at 78, and at the other end to an intermediate portion of the arm 59, as indicated at 79. In the position occupied by the lever as shown in Fig. 1, the arm 59 and the rollers carried thereby are in raised position and the lever rests upon a stop 80 secured to the arm 59.

When the lever 73 is moved about its pivotal point on the upper end of the bar 74, the pivot bolt 78 moves downwardly and when the lever 73 reaches the position indicated in dot and dash lines of Fig. 3, the rollers 68 and 70 engage the bead and drum. Further downward movement of the lever to the position shown in full lines of Fig. 3, will exert considerable force upon the drum and bead and this force is cushioned by the springs 66 because of the fact that the force of the rollers against the drum 29 tends to rock the bar 62 around its pivot point 63 in an anti-clockwise direction, and likewise to rock the bar 64 in an anti-clockwise direction about its pivot point 65, thus compressing the springs 66.

In order to properly position the bead 52 with respect to the drum 29, I have provided a guide member 82 which is mounted upon an angle bracket 83, the latter being bolted to the support 32. A slotted bar 84 comprising a part of the guide is mounted upon the end of the angle bracket and may be adjusted by loosening a bolt 85 which is adapted to slide within the slot. The end of the guide is provided with a vertical roller 86 which is adapted to engage the inner annular portion of the bead. It will be noted by reference to Fig. 1 that the roller 86 of the guide member 82 may be vertically adjusted in the bar 84, a set screw 90 serving to secure the roller support in adjusted position. A similar guide member 87 is secured to the top of the support and is adapted to engage the bead at the side of the drum opposite the guide 82. While I have not shown a roller in connection with the guide 87, it is evident that one may be supplied to this guide if desired.

The flipper-strip while being fed to the bead under the pressure of the rollers and drum is trained over a guide member 88 secured to one corner of the support by means of a bolt 89. It will be noted that this guide is spaced considerably from the drum and is for the purpose of positioning the strip at the proper angle to the bead at the beginning of the stitching operation.

The relative positions of the stitching rollers and drum 29 and the manner in which these members engage the tire bead and strip are shown in detail in Fig. 4. It will be noted from this figure that a strip 94 is folded about the bead 52 in inclosing relationship and extends from one of the corners of the bead in overlapping relation presenting stepped edges 95 and 96. The flipper-strip 37 is positioned against the side of the strip 94 and the edge thereof extends beyond the edge 96, as clearly indicated in the drawings.

In operation of my machine, a tire bead is placed over supporting cone members 49 and rests upon the drum 29. A flipper-strip to be stitched to the bead is trained through the guide 88 and the end thereof placed between the bead and the drum, as indicated in Fig. 4. It will be noted from this figure that the flipper-strip 37 is so positioned that one edge is slightly spaced from the corner of the bead adjacent the flange 36 of the drum and the other edge extends beyond the corner of the bead in the opposite direction and beyond the extending edges 95 and 96 of the enclosing strip. The flanges of the drum 29 and the roller 70 engage the bead when the rollers are lowered by manipulation of the lever 73 so as to confine the bead in transverse surrounding relationship. The roller 68 engages the strip 94 beyond the edge of the bead proper so as to stitch the strip 37 to the edges 95 and 96. By moving the end of the lever 73 downwardly toward the drum 29, the required pressure is exerted to firmly stitch the flipper-strip in the desired position. Pressure is applied to the pedal 22 to start the motor which rotates the drum and consequently the bead. When the bead has been rotated one revolution the strip 37 is firmly secured thereto and the operation is completed.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. A machine comprising a frame having a plurality of rotatable conical members attached thereto for supporting a tire bead, a driven drum, an arm pivoted to the frame, a plurality of roller supports pivotally mounted on the arm, rollers carried by said support and a lever mechanism adapted to force the rollers toward the drum to confine the bead between the rollers and drum.

2. A machine comprising a frame having a plurality of rotatable conical members attached thereto for supporting a tire bead, a driven drum, an arm pivoted to the frame, a plurality of roller supports pivotally mounted on the arm, resilient members disposed between the supports, rollers carried by the supports and a lever mechanism adapted to force the rollers toward the drum to confine the bead between the rollers and drum.

3. A machine comprising a frame having means for supporting an annular bead, a rotatable drum, an arm pivoted to the frame, a plurality of members carried by the arm being provided with yieldable means therebetween, means carried by the members for engaging the drum, and a lever pivoted to a stationary part of the machine and connected to the arm for actuating the arm toward and away from the drum.

4. A machine comprising a frame having means for supporting an annular bead, a rotatable positively driven drum, an arm pivoted to the frame, a lever pivoted to a stationary part of the frame and to the arm and a plurality of members pivoted to the arm being provided with rollers and adapted to be moved with the arm toward and away from the drum as the lever is actuated.

5. A machine comprising a frame having a plurality of rotatable members for supporting an annular tire bead, a driven drum provided with a flange at one edge thereof, an arm pivoted to the frame, a roller provided with a grooved portion including a flange adapted to engage the flange of the drum to confine the bead between the drum and the roller, the latter being operatively connected to the arm, and a second roller connected to the arm and adapted to press the edge of the bead toward the drum.

6. A machine comprising a frame, a plurality of radially disposed members provided with a support located centrally of the frame, cone-shape rollers secured to the members for supporting the tire bead, a driven drum adapted to engage the bead, an arm pivoted to the central support, a bar pivoted to the arm and provided with a roller adapted to guide the bead upon the drum, a second bar pivoted to the arm and having means adapted to engage the edge of the bead upon the drum, resilient means disposed between the bars and a bell crank lever secured to the arm for actuating the bars toward the drum.

7. A machine for applying flipper strips to tire beads comprising a supporting frame, a drum rotatably mounted upon the frame, a pair of parallel arms swingably secured to the frame, rollers secured to the arms and adapted to engage the drum, and resilient means secured between the arms and adapted to permit relative movement therebetween.

8. A machine for applying flipper strips to tire beads comprising a supporting frame, a drum rotatably mounted upon the frame, a pair of arms secured in swinging relation with respect to the frame, a roller secured to each arm adapted to engage the drum, and springs tending to maintain the arms in a predetermined relative position.

9. A machine for applying flipper strips to tire beads comprising a supporting frame, a drum rotatably secured to the frame, a flange upon one edge of the drum adapted to engage the side of a tire bead, a roller movably mounted with respect to said drum, the roller having a flange adapted to engage the flange upon the drum, and having an outwardly beveled portion adjacent the flange for engagement with the beveled side of a tire bead, and a second roller movably secured with respect to the drum and adapted to engage the body of the drum to press the skirt portion of the tire bead.

In witness whereof, I have hereunto signed my name.

JESS A. SHIVELY.